United States Patent
Knight et al.

(10) Patent No.: US 11,053,109 B2
(45) Date of Patent: Jul. 6, 2021

(54) SYSTEMS AND METHODS FOR AUTOMATIC BEVERAGE DISPENSING ACCORDING TO A RECIPE LINKED WITH A MARKER

(71) Applicant: Cornelius, Inc., Osseo, MN (US)

(72) Inventors: Clayton Knight, South Elgin, IL (US); Vincenzo DiFatta, Wood Dale, IL (US); Michal Augustyniak, Elgin, IL (US)

(73) Assignee: Cornelius, Inc., Osseo, MN (US)

(*) Notice: Subject to any disclaimer, the term of this patent is extended or adjusted under 35 U.S.C. 154(b) by 73 days.

(21) Appl. No.: 16/408,012

(22) Filed: May 9, 2019

(65) Prior Publication Data

US 2019/0352161 A1 Nov. 21, 2019

Related U.S. Application Data

(60) Provisional application No. 62/672,304, filed on May 16, 2018.

(51) Int. Cl.
*B67D 1/00* (2006.01)
*B67D 1/08* (2006.01)
(Continued)

(52) U.S. Cl.
CPC ......... *B67D 1/0034* (2013.01); *B67D 1/0894* (2013.01); *B67D 1/1202* (2013.01); *G06K 7/10475* (2013.01); *G06K 19/0723* (2013.01)

(58) Field of Classification Search
CPC .. B67D 1/0034; B67D 1/0894; B67D 1/1202; G06K 7/10475; G06K 19/0723
(Continued)

(56) References Cited

U.S. PATENT DOCUMENTS 2,682,984 A 7/1954 Melikian et al.
4,949,526 A * 8/1990 Brogna ................ B65B 7/2807
221/104
(Continued)

FOREIGN PATENT DOCUMENTS

AU 2017216443 A1 8/2017
WO 2009033106 3/2009
(Continued)

OTHER PUBLICATIONS

Schultz, Richard, et al. "Automated Beverage Dispensing Machines". Pending U.S. Appl. No. 16/002,491, filed Jun. 7, 2018.
(Continued)

*Primary Examiner* — Timothy L Maust
*Assistant Examiner* — James R Hakomaki
(74) *Attorney, Agent, or Firm* — Andrus Intellectual Property Law, LLP (57) ABSTRACT

A system for automatically dispensing beverages according to a drink order. The system includes a conveyor that conveys a plurality of cup holders in and between a cup receiving location, a dispensing location, and a serving location. A cup dispenser is configured to dispense a cup into each of the plurality of cup holders at the cup receiving location. A plurality of additive dispensers is configured to dispense additives to the cup at the dispensing location. A controller is configured to receive the drink order, create a recipe from the drink order and link the recipe with one of the plurality of cup holders via a marker, dispense a cup to the cup holder via the cup dispenser, and thereafter control the conveyor and the plurality of additive dispensers so that the cup is filled with a beverage according to the recipe and then conveyed to the serving location.

20 Claims, 5 Drawing Sheets

(51) Int. Cl.
  *G06K 7/10*      (2006.01)
  *G06K 19/07*     (2006.01)
  *B67D 1/12*      (2006.01)

(58) Field of Classification Search
  USPC .................................................. 141/9
  See application file for complete search history.

(56) References Cited

U.S. PATENT DOCUMENTS

| | | | |
|---|---|---|---|
| 4,989,753 A * | 2/1991 | Brogna | G07F 13/10 |
| | | | 221/121 |
| 5,000,345 A | 3/1991 | Brogna et al. | |
| 5,058,630 A * | 10/1991 | Wiley | G07F 13/10 |
| | | | 141/1 |
| 6,053,359 A * | 4/2000 | Goulet | B65G 1/133 |
| | | | 221/221 |
| 6,102,246 A | 8/2000 | Goulet et al. | |
| 6,782,307 B2 * | 8/2004 | Wilmott | A61K 8/9761 |
| | | | 700/233 |
| 8,448,566 B2 | 5/2013 | Rezeki | |
| 8,690,016 B2 | 4/2014 | Anderson et al. | |
| 8,910,674 B2 * | 12/2014 | Segiet | G06Q 20/3278 |
| | | | 141/198 |
| 8,996,178 B2 | 3/2015 | Studor et al. | |
| 9,045,323 B2 | 6/2015 | Crane et al. | |
| 9,154,547 B2 | 10/2015 | Kuempel et al. | |
| 9,193,576 B2 | 11/2015 | Nighy | |
| 9,204,734 B2 * | 12/2015 | Jablonski | A47F 1/085 |
| 9,212,040 B2 * | 12/2015 | Segiet | B67D 3/0077 |
| 9,290,371 B2 | 3/2016 | Crane et al. | |
| 9,370,273 B2 | 6/2016 | Li et al. | |
| 9,499,385 B1 * | 11/2016 | Studor | G06Q 20/18 |
| 9,701,530 B2 | 7/2017 | Kline et al. | |
| 9,809,437 B2 | 11/2017 | Tansey, Jr. | |
| 9,865,023 B2 * | 1/2018 | Insolia | G06Q 50/04 |
| 9,944,472 B2 | 4/2018 | Crane et al. | |
| 10,017,372 B2 | 7/2018 | Bethuy et al. | |
| 10,031,505 B2 | 7/2018 | Martindale et al. | |
| 10,059,581 B2 | 8/2018 | Peters et al. | |
| 10,239,742 B2 * | 3/2019 | Dresser | B67D 1/0888 |
| 2008/0271809 A1 * | 11/2008 | Goldman | B67C 3/208 |
| | | | 141/9 |
| 2011/0023505 A1 | 2/2011 | Popov et al. | |
| 2011/0264284 A1 * | 10/2011 | Rudick | B67D 1/124 |
| | | | 700/283 |
| 2013/0085874 A1 | 4/2013 | Gagne et al. | |
| 2014/0230660 A1 | 8/2014 | He | |
| 2014/0345468 A1 | 11/2014 | Talon et al. | |
| 2015/0122130 A1 | 5/2015 | Wunder | |
| 2015/0175400 A1 | 6/2015 | Newman | |
| 2015/0351583 A1 * | 12/2015 | Weigelt | G06K 19/067 |
| | | | 426/87 |

FOREIGN PATENT DOCUMENTS

| | | |
|---|---|---|
| WO | 2015022692 A2 | 2/2015 |
| WO | 2018140546 A1 | 8/2018 |
| WO | 2019026027 A1 | 2/2019 |
| WO | 2019032969 A1 | 2/2019 |

OTHER PUBLICATIONS

International Search Report and Written Opinion for PCT/US2019/032113, dated Jul. 23, 2019.
International Preliminary Report on Patentability for PCT/US2019/032113, dated Nov. 26, 2020.

* cited by examiner

SYSTEMS AND METHODS FOR AUTOMATIC BEVERAGE DISPENSING ACCORDING TO A RECIPE LINKED WITH A MARKER

CROSS REFERENCE TO RELATED APPLICATIONS

This application claims the benefit of U.S. Provisional Patent Application No. 62/672,304, filed May 16, 2018, which is incorporated herein by reference in its entirety.

FIELD

The present disclosure relates to systems and methods for automatic beverage dispensing.

BACKGROUND

The Background and Summary are provided to introduce a foundation and selection of concepts that are further described below in the Detailed Description. The Background and Summary are not intended to identify key or essential features of the claimed subject matter, nor are they intended to be used as an aid in limiting the scope of the claimed subject matter.

The following U.S. patents are incorporated herein by reference: U.S. Pat. Nos. 9,944,472; 9,370,273; 9,290,371; 9,204,734; 9,193,576; 9,045,323; 8,690,016; and 8,448,566; and U.S. patent application Ser. No. 16/002,491.

SUMMARY

One embodiment according to the present disclosure generally relates to a system for automatically dispensing a beverage according to a drink order. The system includes a conveyor that conveys a plurality of cup holders in and between a cup receiving location, a dispensing location, and a serving location. A cup dispenser is configured to dispense a cup into each of the plurality of cup holders at the cup receiving location. A plurality of additive dispensers is configured to dispense additives to the cup at the dispensing location. A controller is configured to receive the drink order, create a recipe from the drink order and link the recipe with one of the plurality of cup holders via a marker, dispense a cup to the cup holder via the cup dispenser, and thereafter control the conveyor and the plurality of additive dispensers so that the cup is filled with a beverage according to the recipe and then conveyed to the serving location.

Another embodiment according to the present disclosure generally relates to a method for automatically dispensing a beverage based on a drink order. The method includes receiving by a controller the drink order, then creating by the controller a recipe for fulfilling the drink order. The method further includes controlling a conveyor having a plurality of cup holders such that the plurality of cup holders are conveyed in and between a cup receiving location, a dispensing location, and a serving location. The conveyor is controlled by the controller and each of the plurality of cup holders has a marker associated therewith. The method further includes dispensing a cup into one of the plurality of cup holders at the cup receiving location, wherein the cup is dispensed by a cup dispenser controlled by the controller. The method further includes linking the recipe with the one of the plurality of cup holders via the marker associated therewith, then dispensing additives into the cup at the dispensing location via a plurality of additive dispensers so that the cup is filled according to the recipe.

BRIEF DESCRIPTION OF THE DRAWINGS

The drawings illustrate embodiments for carrying out the disclosure. The same numbers are used throughout the drawings to reference like features and like components. In the drawings.

DETAILED DESCRIPTION OF THE DRAWINGS

Through research and experimentation, the inventors have recognized that it is desirable to speed up crew serve operations for dispensing coffee and other beverages. With this in mind, the present inventors invented the presently disclosed modular systems and methods for automated beverage and beverage additive dispensing. However, it should be noted that the present disclosure is also applicable to other dispensing processes, such as dispensing a frozen yogurt product and/or the like.

Figure 1:
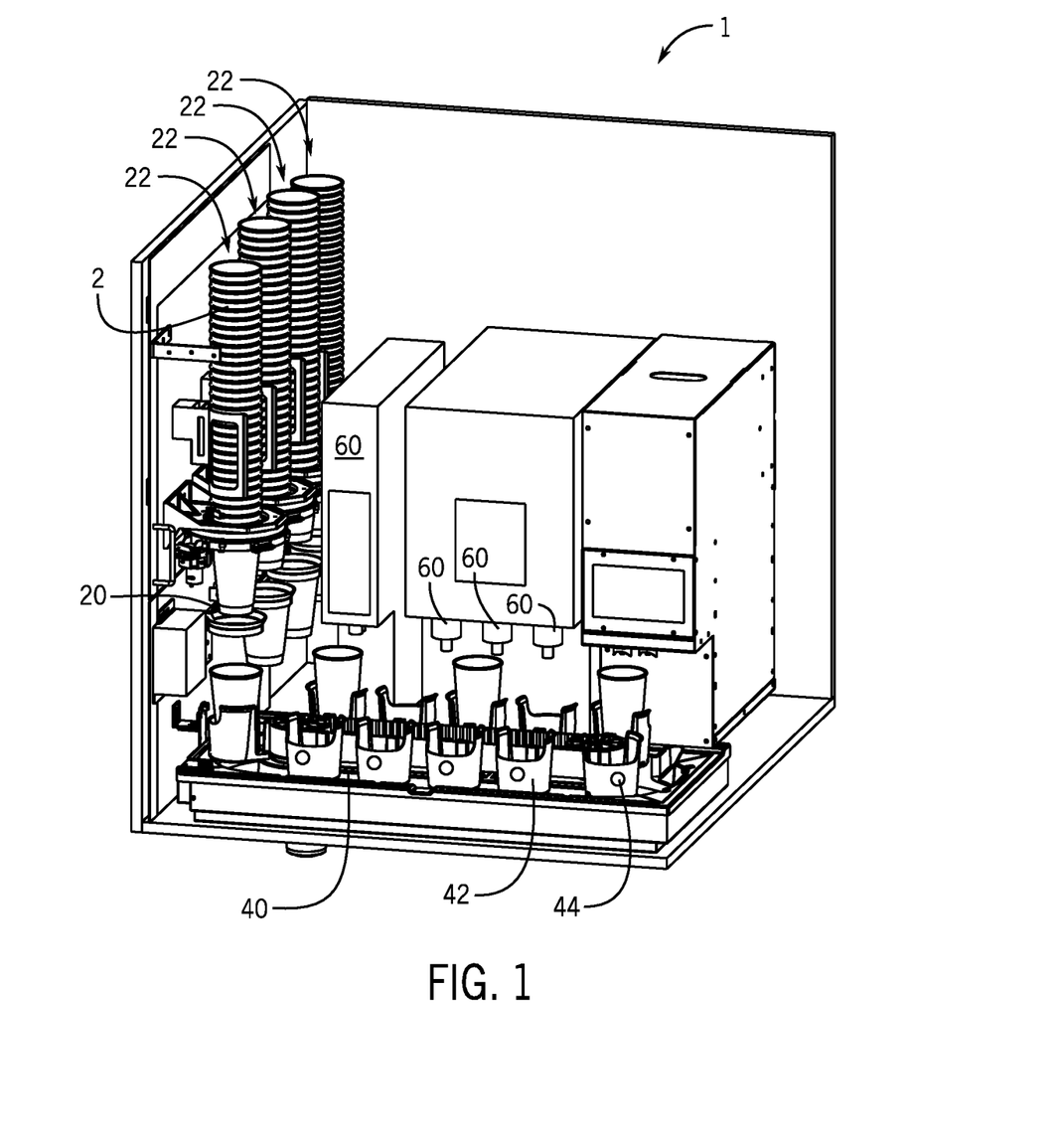
FIG. 1 is a perspective view of an exemplary system for dispensing beverages according to the present disclosure.

As shown in FIG. 1, the present disclosure generally relates to a beverage dispensing system 1 for automatically dispensing beverages. In general, the system 1 dispenses an empty cup 2 into one of a series of cup holders 42 that are rotated on a motorized conveyor 40. The motorized conveyor 40 then moves the cup holder 42, along with the cup 2 carried therein, past a series of additive dispensers 60. The additive dispensers 60 are each configured to dispense a respective additive into the cup 2 according to a recipe for a given order assigned to that cup 2. Exemplary beverage dispensing systems known in the art are discussed in the U.S. patents and patent applications referenced above, including in particular U.S. patent application Ser. No. 16/002,491.

Figure 2:
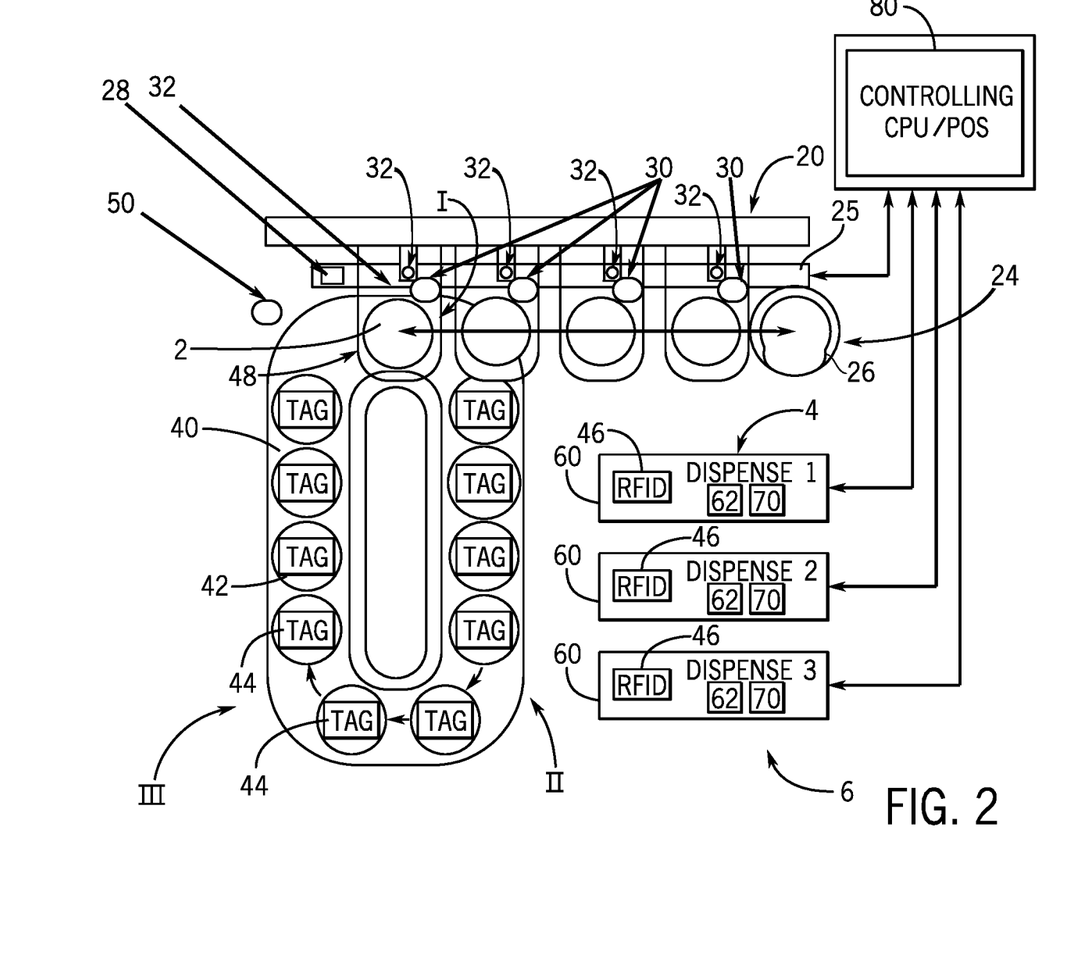
FIG. 2 is a top down view of an exemplary system such as that shown in FIG. 1.

FIG. 2 is an overhead, schematic depiction of an exemplary system 1 according to the present disclosure in further detail. A main controller 80 is programmed to fulfill a recipe for an order based upon an input from a user input device 81 (FIG. 5), which is discussed further below. Input devices include a keyboard, mouse, and/or touch screen of a POS or self-serve kiosk, an app on a mobile device, and/or the like. Cups 2 for fulfilling an order are retained within storage chambers 22, such as one for each size (small, medium, large) and/or type (hot, cold) of cup 2.

The main controller 80 receives an order to be fulfilled and dispenses an appropriately sized cup 2 from the storage chambers 22 to the cup holder 42 via a cup dispenser 20. In certain examples, the cup dispenser 20 may release a cup 2 from one of the storage chambers 22, for example into a funnel that directs the cup 2 into one of the cup holders 42 on the conveyor 40 (not shown). An exemplary release mechanism for releasing cups 2 from the storage chambers 22 available commercially is the 674DC series cup dispenser by Componenti Vending S.p.A.

Figure 3:
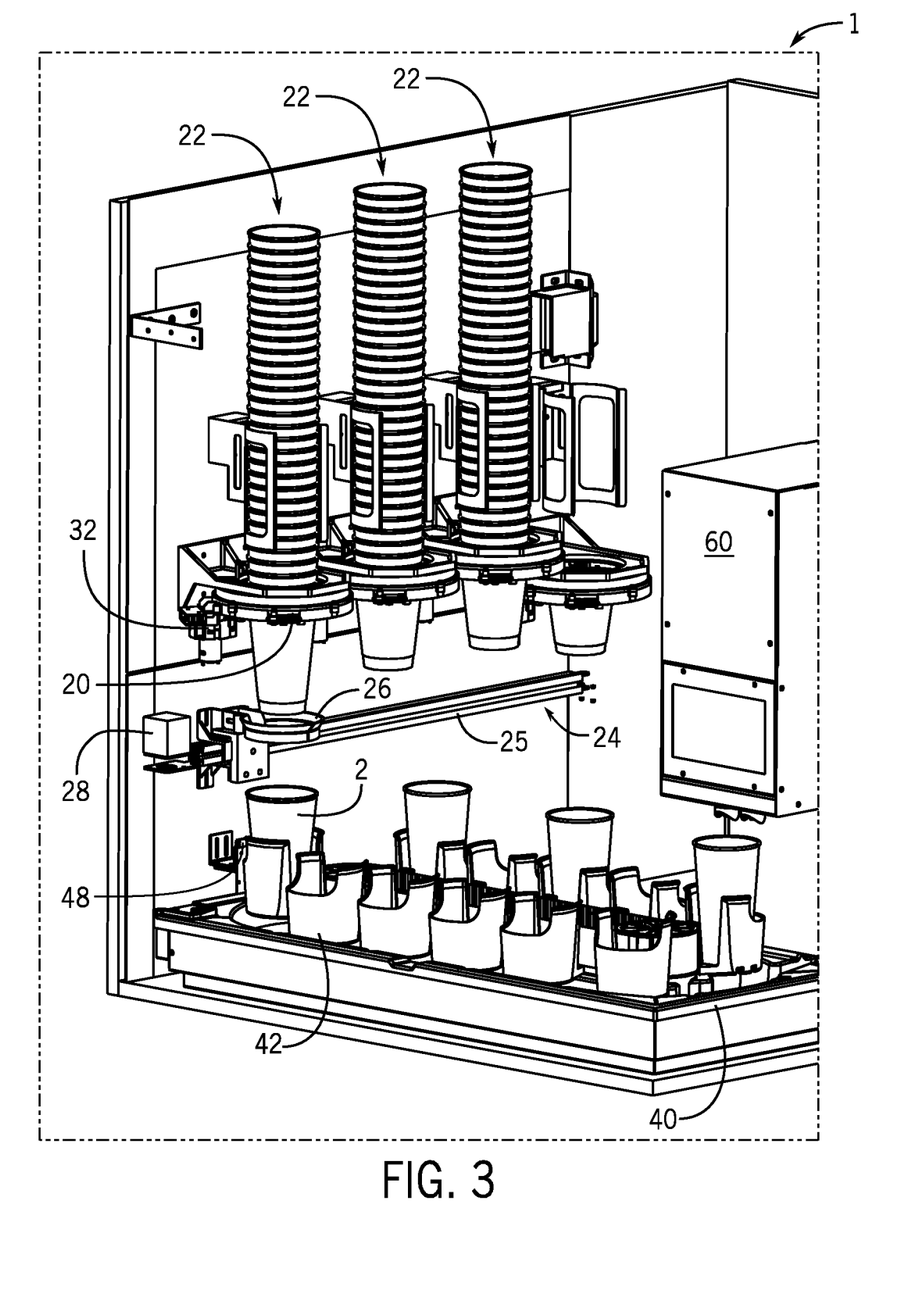
FIG. 3 is a close up perspective view of an exemplary system such as that shown in FIG. 1.
Figure 4:
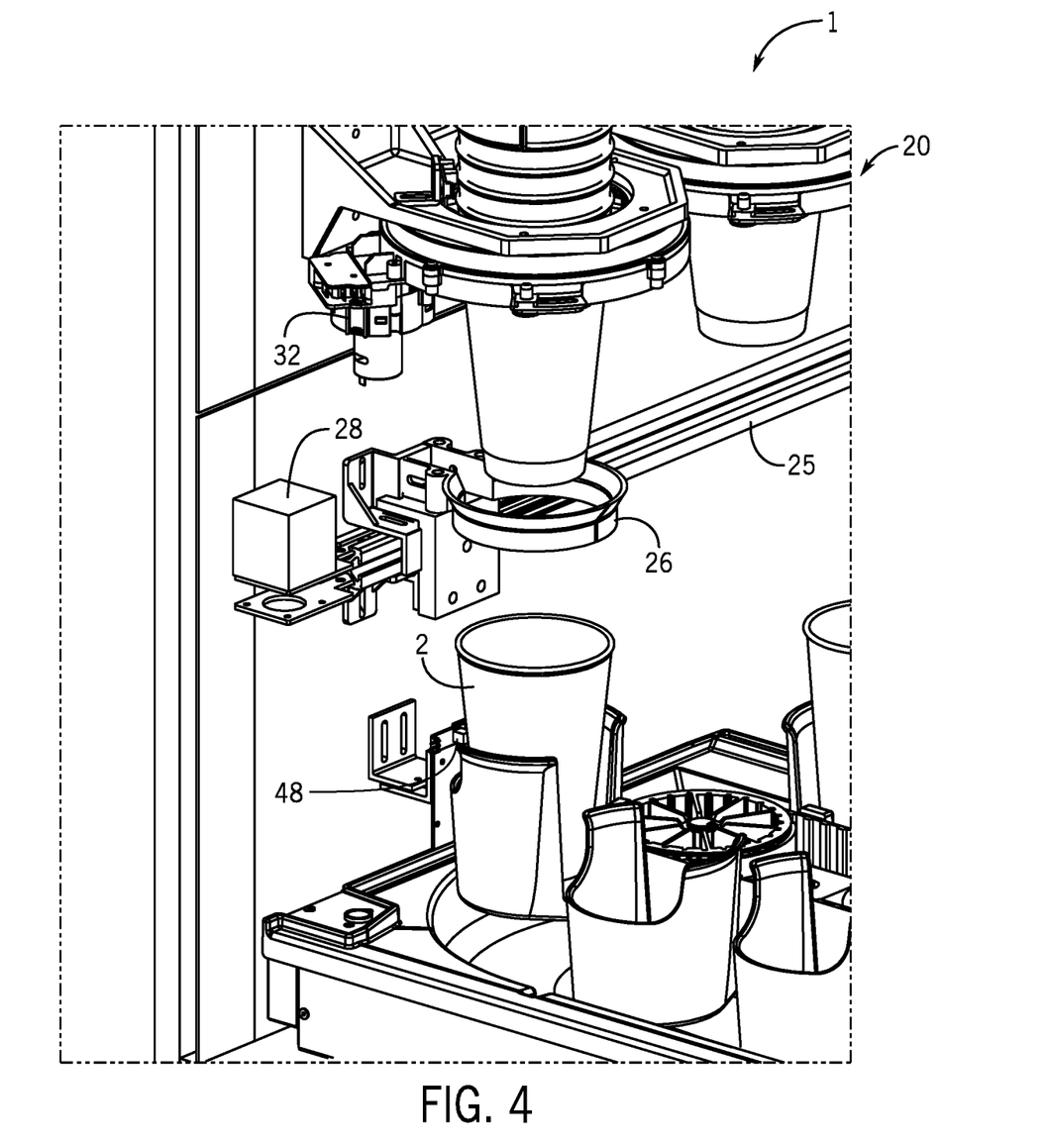
FIG. 4 is a closer view of a portion of FIG. 3.

In other embodiments, such as that shown FIGS. 3-4, the cup dispenser 20 includes a cup slide 24 that moves the cup 2 from the storage chamber 22 in which it was released to a desired position above one of the cup holders 42. The cup slide 24 has a cup support 26 that receives a cup 2 released from one of the storage chambers 22. The cup support 26 is transitionally moveable along a rail 25 to subsequently transport the cup 2 to a home position 28. The cup support 26 then releases the cup 2 such that the cup 2 falls or is otherwise guided into the cup holder 42. The region of the conveyor 40 where the cup holder 24 receives a cup 2 from the cup dispenser 20 is referred to as the cup receiving location I (FIG. 2).

The recipe to be fulfilled is assigned or linked to a particular cup 2, or in certain embodiments with the particular cup holder 42 holding the particular cup 2, using a marker 44. Examples of markers 44 include electronic markers such as RFID tags, as well as non-electric markers such as QR codes, 2D barcodes, and/or the like. The markers 44 are readable with the input sensor 48 and other sensors 46 (discussed below) corresponding thereto. Exemplary RFID readers available commercially include the MiFare RC522.

As shown in FIGS. 2-4, an input sensor 48 may be provided at or near the home position 28 of the cup slide 24 where the cup dispenser 20 is positioned to drop the cup 2. In the case of the cup 2 having the marker 44, the input sensor 48 retrieves the information from the marker 44 of a cup 2 immediately before, or as the cup 2 is being dispensed. In this manner, the recipe to be fulfilled can be identifiably linked to the particular cup 2 (or cup holder 42 holding the cup 2) being filled.

The input sensor 48 may alternatively be positioned adjacent to the conveyor 40 in or near the cup receiving location I to achieve this same identification of information associated with the cup 2 or cup holder 42. This latter configuration is also particularly suited for reading the marker 44 when associated with the cup holder 42 rather than the cup 2. The main controller 80 may retain the information from the marker 44 and the association with the order and recipe to be fulfilled itself, and/or may communicate this information with control modules 70 associated with one or more of the additive dispensers 60. In this manner, each marker 44 can at any time be used to identify the correspondingly assigned recipe and the constituent additives required to be dispensed with that particular cup 2 to complete the recipe.

As discussed above, a sensor 46 is provided in certain embodiments with each of the additive dispensers 60 to read the recipe associated with a particular cup 2 or cup holder 42 (via the marker 44) throughout the entire conveyance process. In other embodiments, the main controller 80 may use information regarding the position of a particular cup 2 within a known number of cup holders 42 to infer the location of the cup 2 without additional sensors 46. Likewise, additive dispensers 60 may share information regarding the position of a cup 2, for example, to reduce the total number of required sensors 46 for reading the markers 44.

Once the cup 2 is dispensed into the cup holder 42 and the recipe is associated or linked with the corresponding marker 44, the main controller 80 unlocks the conveyor 40, which moves the cup 2 past each of the plurality of additive dispensers 60. In the configuration of FIG. 2, each of the additive dispensers 60 has a sensor 46 for reading the markers 44 of the passing cup 2 and/or cup holders 42. If the passing cup holder 42 or cup 2 has a marker 44 (such as an RFID serial number) that is linked to a recipe requiring the additive of that particular additive dispenser 60, the main controller 80 stops the conveyor 40 and the additive is dispensed from the additive dispenser 60 into the cup 2. If instead the recipe for that cup 2 does not call for the additive contained within a given additive dispenser 60, the cup 2 is ignored and the conveyor 40 moves the cup holder 42 to the next location.

It should be recognized that even if one cup 2 need not stop at a given additive dispenser 60, the main controller 80 may nonetheless stop the conveyor 40 for other cups 2 to receive additives.

One or more "base" beverages can be added to the cup 2 via an additive dispenser 60, added manually, or added via a conventional additive dispenser 60, for example under control of the main controller 80. Exemplary base beverages include regular and decaffeinated coffee, regular and decaffeinated tea (including black, green, and white, for example), espresso, soda, milkshake (including vanilla, chocolate, and strawberry, for example) and/or the like. The base beverage may be added after or before the additives, as necessary. Exemplary additives include dairy and/or non-dairy creamer, sugar, sugar substitutes, flavoring, and/or the like. Once the dispensing of additive is complete, the conveyor 40 is unlocked and allowed to proceed. This process continues until the dispensed cup 2 passes all additive dispensers 60 within the dispensing location II.

The system 1 presently disclosed advantageously allows each component, such as the base beverage dispenser, additive dispensers, etc., to be arbitrarily located with respect to each other, or based upon particular design needs and/or space constraints. It should be recognized that all dispensable goods, including both base beverages and additives, are also referred to herein collectively as "additives" (dispensed by additive dispensers 60) unless otherwise stated, each being added to a cup 2.

Figure 5:
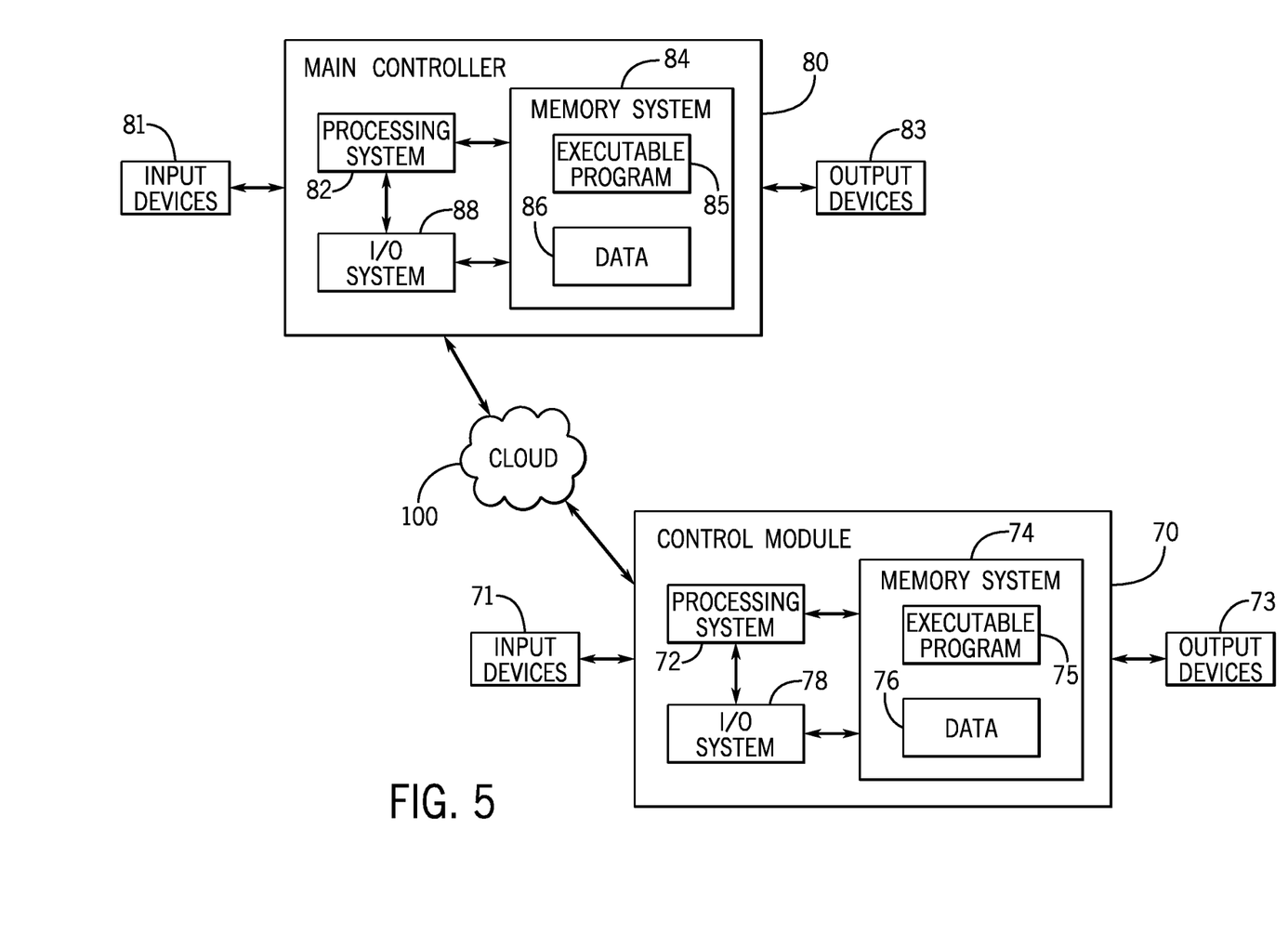
FIG. 5 is a schematic view of an exemplary controls system for controlling a system according to the present disclosure.

FIG. 5 provides additional detail regarding the main controller 80, control modules 70 associated with the additive dispensers 60, and communication therebetween. Certain aspects of the present disclosure are described or depicted as functional and/or logical block components or processing steps, which may be performed by any number of hardware, executable program, and/or firmware components configured to perform the specified functions. For example, certain embodiments employ integrated circuit components, such as memory elements, digital signal processing elements, logic elements, look-up tables, or the like, configured to carry out a variety of functions under the control of one or more processors or other control devices. The connections between functional and logical block components are merely exemplary, which may be direct or indirect, and may follow alternate pathways.

The following describes exemplary versions of the main controller 80 and control modules 70 together. However, it should be recognized that the control modules 70 may vary from each other and/or from the main controller 80. The main controller 80 and/or control modules 70 may be computing systems that include processing systems 82, 72, memory systems 84, 74, executable programs 85, 75, and input/output (I/O) systems 88, 78 for communicating with other devices (including input devices 81, 71 and/or output devices 83, 73). Exemplary input devices 81, 71 include POS systems, the main controller 80 (from the perspective of a control module 70), control modules 70 (from the perspective of another control module 70 or the main controller 80), sensors 46 and other sensors, and/or the like. Exemplary output devices 83, 73 include display devices, alarms and other notification systems, dispensing hardware in the additive dispensers 60, hardware for the cup slide 24 and conveyor 40, and/or the like.

The processing systems 82, 72 load and execute the executable programs 85, 75 from the memory systems 84, 74, which direct the system 1 to operate as described above. The processing systems 82, 72 may be implemented as a single microprocessor or other circuitry, or be distributed across multiple processing devices or sub-systems that cooperate to execute the executable programs 85, 75 from the memory systems 84, 74. Non-limiting examples of the processing system 82, 72 include general purpose central processing units, applications specific processors, and logic devices.

The memory system 84, 74 may comprise any storage media readable by the processing system 82, 72 and capable of storing executable program 85, 75. The memory system 84, 74 may also store data 86, 76, such as the total number of cup holders 42 on the conveyor 40, recipes to be fulfilled, and the like. The memory system 84, 74 may be implemented as a single storage device, or be distributed across multiple storage devices or sub-systems that cooperate to store computer readable instructions, data structures, program modules, or other data. The memory system 84, 74 may include volatile and/or non-volatile systems, and may include removable and/or non-removable media implemented in any method or technology for storage of information. The storage media may include non-transitory and/or transitory storage media, including random access memory, read only memory, magnetic discs, optical discs, flash memory, virtual memory, and non-virtual memory, magnetic storage devices, or any other medium which can be used to store information and be accessed by an instruction execution system, for example.

Returning to FIG. 2, certain embodiments according to the present disclosure incorporate further sensors to ensure proper functioning of the system 1. A last cup sensor 50 is provided at or near the end of the serving location III, which is the location or region where the completed beverages are ready to be picked up by an employee or otherwise served to customers. This last cup sensor 50 may be an ultrasonic device or other sensor configured to determine whether a cup 2 remains on the conveyor 40 within a given cup holder 42. An exemplary last cup sensor 50 available commercially is the Balluff BUS004E. If a cup 2 is detected to be present beyond this serving location III, the main controller 80 ceases rotation of the conveyor and/or triggers an indicator or alarm (not shown). This process of incorporating a last cup sensor 50 thereby ensures that the conveyor 40 does not move a dispensed cup 2 back underneath the home position 28, which could result in accidental cups 2 stacking and/or an overflow or overfill condition (in addition to negatively impacting the fulfillment of the recipes associated therewith). In short, this allows the system 1 to safely queue multiple orders at once.

The system 1 also includes a cup sold out sensor 30 that identifies any sizes or types of cups 2 that have been depleted from the storage chambers 22 (see FIG. 3), allowing the operator to restock. Similarly, a cup drop sensor 32 ensures that a cup 2 was successfully dropped into a cup holder 42 position before the conveyor 40 is permitted to continue rotating and completing an order. Exemplary cup sold out sensor 30 and cup drop sensors 32 may include commercially available IR sensor, for example.

The inventors have identified that the presently disclosed system 1 advantageously provides a minimalistic approach to cup 2 dispense and movement, which reduces cost and space requirements. Using markers 44 and sensors, such as sensors 46, provides a modular approach to additive dispensers 60, allowing the designer of the system 1 to scale the design based upon a particular number of additive dispensers 60 needed. This also allows components such as additive dispensers 60 to be moved to arbitrary positions in the line of movement, making counter space considerations easier to manage. In certain examples, multiple additive dispensers 60 may also dispense the same additive, permitting additional capacity for the system 1.

Certain embodiments according to the present disclosure relate to a system for automatically dispensing a beverage according to a drink order. The system includes a conveyor that conveys a plurality of cup holders in and between a cup receiving location, a dispensing location, and a serving location. A cup dispenser is configured to dispense a cup into each of the plurality of cup holders at the cup receiving location. A plurality of additive dispensers is configured to dispense additives to the cup at the dispensing location. A controller is configured to receive the drink order, create a recipe from the drink order and link the recipe with one of the plurality of cup holders via a marker, dispense a cup to the cup holder via the cup dispenser, and thereafter control the conveyor and the plurality of additive dispensers so that the cup is filled with a beverage according to the recipe and then conveyed to the serving location.

In certain embodiments, the marker is an electronic marker and the system further includes an electronic marker sensor configured to read the electronic marker.

In certain embodiments, the electronic marker is an RFID tag and the electronic marker sensor is a plurality of RFID sensors each associated with the plurality of additive dispensers.

In certain embodiments, the markers are fixed relative to the plurality of cup holders.

Certain embodiments include a plurality of storage chambers configured to the hold the cups prior to being dispensed by the cup dispenser, where at least two of the plurality of storage chambers are configured to hold different sizes of the cups.

In certain embodiments, each of the plurality of storage chambers further includes a cup sold out sensor configured to determine when the cups have been fully depleted therefrom.

In certain embodiments, the cup dispenser may also include a cup slide having a cup support configured to receive the cup from one of the plurality of storage chambers and move the cup to the cup dispensing position.

In certain embodiments, the dispensing location is multiple dispensing locations, where each of the multiple dispensing locations is associated with one of the plurality of additive dispensers. The plurality of additive dispensers may be arranged in one of multiple sequences, where the multiple sequences of the plurality of additive dispensers is not dictated by the recipe.

Certain embodiments include a last cup sensor, where the conveyor is prevented from being further conveyed when the last cup sensor detects that the cup is positioned at an end of the serving location. The last cup sensor may be an ultrasonic sensor.

In certain embodiments, the plurality of additive dispensers is modular and the controller is configured to operate with varying numbers of the plurality of additive dispensers. The two or more of the plurality of additive dispensers may be configured to dispense the same one of the additives.

In certain embodiments, a size of the cup is associated with the marker, and the plurality of additive dispensers are configured to dispense the additive in accordance with the size of the cup.

In certain embodiments, the marker is an RFID tag and the system further includes a plurality of RFID sensors each associated with the plurality of additive dispensers and configured to read the RFID tag, where the plurality of additive dispensers are arranged in one of multiple sequences, and where the multiple sequences of the plurality of additive dispensers is not dictated by the recipe.

In certain embodiments, the system further includes a plurality of storage chambers configured to the hold the cups prior to being dispensed by the cup dispenser, where at least two of the plurality of storage chambers are configured to hold different sizes of the cups.

In certain embodiments, the system further includes a last cup sensor, where the conveyor is prevented from being further conveyed when the last cup sensor detects that the cup is positioned at an end of the serving location.

The present disclosure further relates to a method for automatically dispensing a beverage based on a drink order, where the method includes receiving by a controller the drink order and creating by the controller a recipe for fulfilling the drink order. The method further includes controlling a conveyor having a plurality of cup holders such that the plurality of cup holders are conveyed in and between a cup receiving location, a dispensing location, and a serving location, where the conveyor is controlled by the controller, and where each of the plurality of cup holders has a marker associated therewith. The method further includes dispensing a cup into one of the plurality of cup holders at the cup receiving location, where the cup is dispensed by a cup dispenser controlled by the controller. The method further includes linking the recipe with the one of the plurality of cup holders via the marker associated therewith, and dispensing additives into the cup at the dispensing location via a plurality of additive dispensers so that the cup is filled according to the recipe.

In certain embodiments, the marker is an electronic marker and the method further includes reading by each of the plurality of additive dispensers the electronic marker and determining whether the recipe linked with the electronic marker includes the additive contained therewith. The method further includes only dispensing the additive when the recipe is determined to include the additive.

In certain embodiments, the electronic marker is an RFID tag.

In certain embodiments, the method further includes detecting with a last cup sensor whether the cup remains on the conveyor at an end of the serving location, where the conveyor conveys the plurality of cup holders only when the cup is not detected to be at the end of the serving location.

In certain embodiments, the plurality of additive dispensers are arranged in one of multiple sequences, and the additives are dispensed into the cup in the one of the multiple sequences.

In the present description, certain terms have been used for brevity, clarity and understanding. No unnecessary limitations are to be inferred therefrom beyond the requirement of the prior art because such terms are used for descriptive purposes only and are intended to be broadly construed.

What is claimed is:

1. A system for automatically dispensing a beverage according to a drink order, the system comprising:
   a conveyor that conveys a plurality of cup holders in and between a cup receiving location, a dispensing location, and a serving location;
   a cup dispenser configured to dispense a cup into each of the plurality of cup holders at the cup receiving location;
   a plurality of additive dispensers configured to dispense additives to the cup at the dispensing location, the additive dispensers each being modular such that the additive dispensers are arrangeable in at least two different sequences; and
   a controller configured to receive the drink order, create a recipe from the drink order and link the recipe with one of the plurality of cup holders via a marker, dispense a cup to the cup holder via the cup dispenser, and thereafter control the conveyor and the plurality of additive dispensers so that the cup is filled with a beverage according to the recipe and then conveyed to the serving location, wherein when filling the cup according to the recipe the controller controls the additive dispensers differently based on the arrangement among the at least two different sequences.

2. The system according to claim 1, wherein the marker is an electronic marker, further comprising an electronic marker sensor configured to read the electronic marker.

3. The system according to claim 2, wherein the electronic marker is an RFID tag, and wherein the electronic marker sensor is a plurality of RFID sensors each associated with the plurality of additive dispensers.

4. The system according to claim 1, wherein the markers are fixed relative to the plurality of cup holders.

5. The system according to claim 1, further comprising a plurality of storage chambers configured to the hold the cups prior to being dispensed by the cup dispenser, wherein at least two of the plurality of storage chambers are configured to hold different sizes of the cups.

6. The system according to claim 5, wherein each of the plurality of storage chambers further comprises a cup sold out sensor configured to determine when the cups have been fully depleted therefrom.

7. The system according to claim 5, wherein the cup dispenser further comprises a cup slide having a cup support configured to receive the cup from one of the plurality of storage chambers and move the cup to the cup dispensing position.

8. The system according to claim 1, wherein the dispensing location is multiple dispensing locations, wherein each of the multiple dispensing locations is associated with one of the plurality of additive dispensers.

9. The system according to claim 1, wherein the at least two different sequences of the plurality of additive dispensers is not dictated by the recipe.

10. The system according to claim 1, further comprising a last cup sensor, wherein the conveyor is prevented from being further conveyed when the last cup sensor detects that the cup is positioned at an end of the serving location.

11. The system according to claim 10, wherein the last cup sensor is an ultrasonic sensor.

12. The system according to claim 1, wherein the controller is configured to operate with varying numbers of the plurality of additive dispensers arranged within the system.

13. The system according to claim 1, wherein two or more of the plurality of additive dispensers are configured to dispense the same one of the additives.

14. The system according to claim 1, wherein a size of the cup is associated with the marker, and wherein the plurality of additive dispensers are configured to dispense the additive in accordance with the size of the cup.

15. The system according to claim 1, wherein the marker is an RFID tag, further comprising a plurality of RFID sensors each associated with the plurality of additive dispensers and configured to read the RFID tag, wherein the plurality of additive dispensers are arranged in one of multiple sequences, and wherein the multiple sequences of the plurality of additive dispensers is not dictated by the recipe, further comprising a plurality of storage chambers configured to the hold the cups prior to being dispensed by the cup dispenser, wherein at least two of the plurality of storage chambers are configured to hold different sizes of the cups, and further comprising a last cup sensor, wherein the conveyor is prevented from being further conveyed when the last cup sensor detects that the cup is positioned at an end of the serving location.

16. A method for automatically dispensing a beverage based on a drink order, the method comprising:
- receiving by a controller the drink order;
- creating by the controller a recipe for fulfilling the drink order;
- controlling a conveyor having a plurality of cup holders such that the plurality of cup holders are conveyed in and between a cup receiving location, a dispensing location, and a serving location, wherein the conveyor is controlled by the controller, and wherein each of the plurality of cup holders has a marker associated therewith;
- dispensing a cup into one of the plurality of cup holders at the cup receiving location, wherein the cup is dispensed by a cup dispenser controlled by the controller;
- linking the recipe with the one of the plurality of cup holders via the marker associated therewith; and
- dispensing additives into the cup at the dispensing location via a plurality of additive dispensers so that the cup is filled according to the recipe, wherein the additive dispensers are modular so as to be arrangeable in at least two different sequences, and wherein when filling the cup according to the recipe the controller controls the additive dispensers differently based on the arrangement among the at least two different sequences.

17. The method according to claim 16, wherein the marker is an electronic marker, further comprising reading by each of the plurality of additive dispensers the electronic marker and determining whether the recipe linked with the electronic marker includes the additive contained therewith, further comprising only dispensing the additive when the recipe is determined to include the additive.

18. The method according to claim 17, wherein the electronic marker is an RFID tag.

19. The method according to claim 16, further comprising detecting with a last cup sensor whether the cup remains on the conveyor at an end of the serving location, wherein the conveyor conveys the plurality of cup holders only when the cup is not detected to be at the end of the serving location.

20. The method according to claim 16, wherein the additives are dispensed into the cup based on which of the at least two different sequences the additive dispensers are arranged in.

\* \* \* \* \*